United States Patent [19]
Keedy

[11] 4,257,641
[45] Mar. 24, 1981

[54] VEHICLE DRAG REDUCER

[76] Inventor: Edgar L. Keedy, P.O. Box 83, Liberty Center, Ohio 43532

[21] Appl. No.: 42,531

[22] Filed: May 25, 1979

[51] Int. Cl.³ .............................................. B62D 35/00
[52] U.S. Cl. ..................................... 296/1 S; 296/91
[58] Field of Search .................................. 296/1 S, 91

[56] References Cited

U.S. PATENT DOCUMENTS

| | | | |
|---|---|---|---|
| 2,569,983 | 10/1951 | Favre | 296/1 S |
| 2,781,226 | 2/1957 | Tydon | 296/1 S |
| 3,815,948 | 6/1974 | Alford | 296/1 S |
| 4,142,755 | 3/1979 | Keedy | 296/1 S |

FOREIGN PATENT DOCUMENTS

| | | | |
|---|---|---|---|
| 593130 | 2/1934 | Fed. Rep. of Germany | 296/1 S |
| 1197426 | 12/1959 | France | 296/1 S |
| 146663 | 8/1962 | U.S.S.R. | 296/1 S |

*Primary Examiner*—John J. Love
*Assistant Examiner*—Ross Weaver
*Attorney, Agent, or Firm*—Oliver E. Todd, Jr.

[57] ABSTRACT

An aerodynamic drag reducer for use on a vehicle having two sidewalls, a roof and a floor is disclosed. The drag reducer forms an enclosure on the rear end of the vehicle whereby aerodynamic drag against the vehicle is substantially reduced. The drag reducer forms an integral part of the rear end of the vehicle and is easily collapsed to facilitate low-speed, inner-city driving. In one embodiment of the invention, spoilers are added to the sides of the vehicle.

2 Claims, 9 Drawing Figures

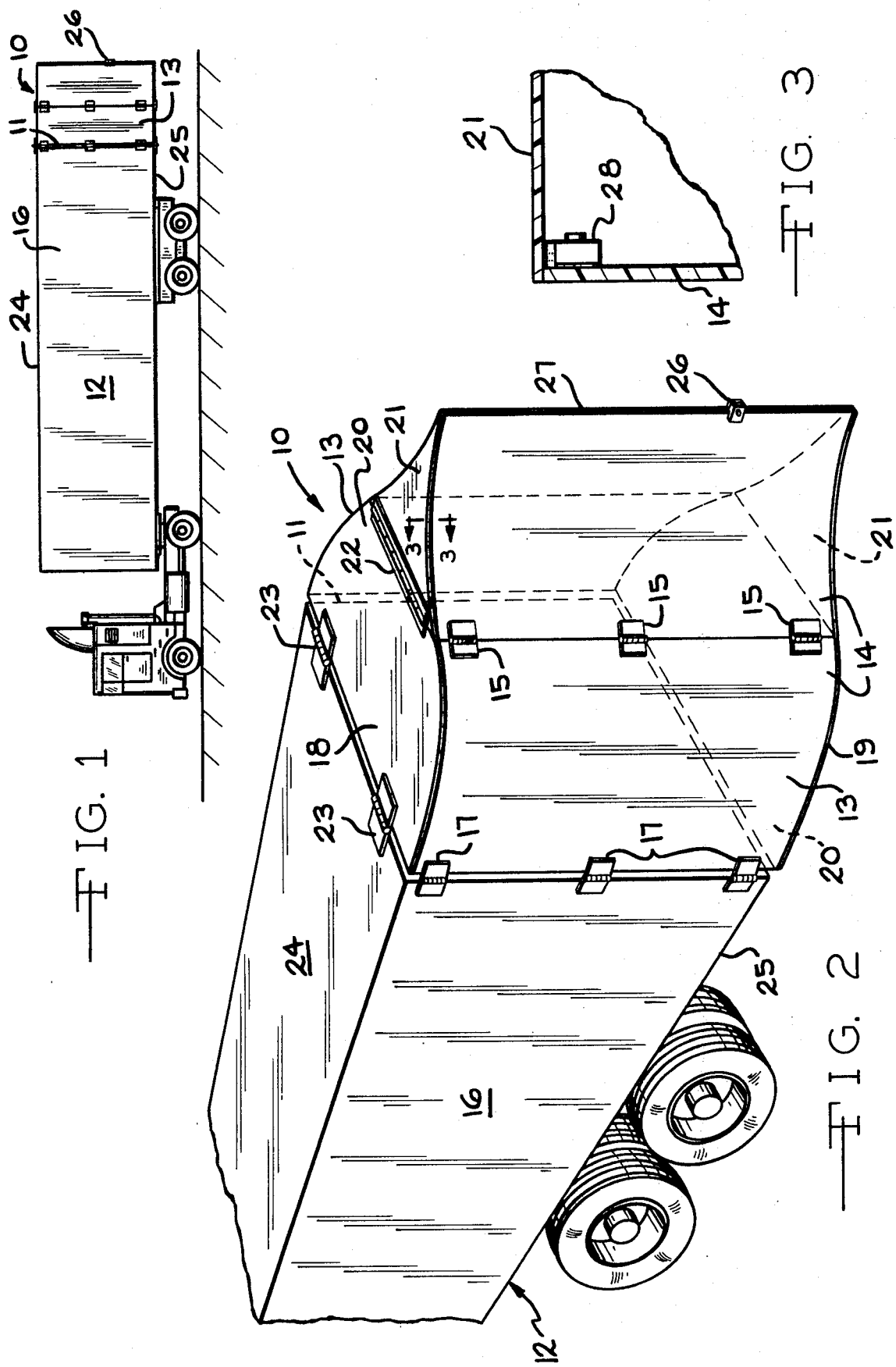

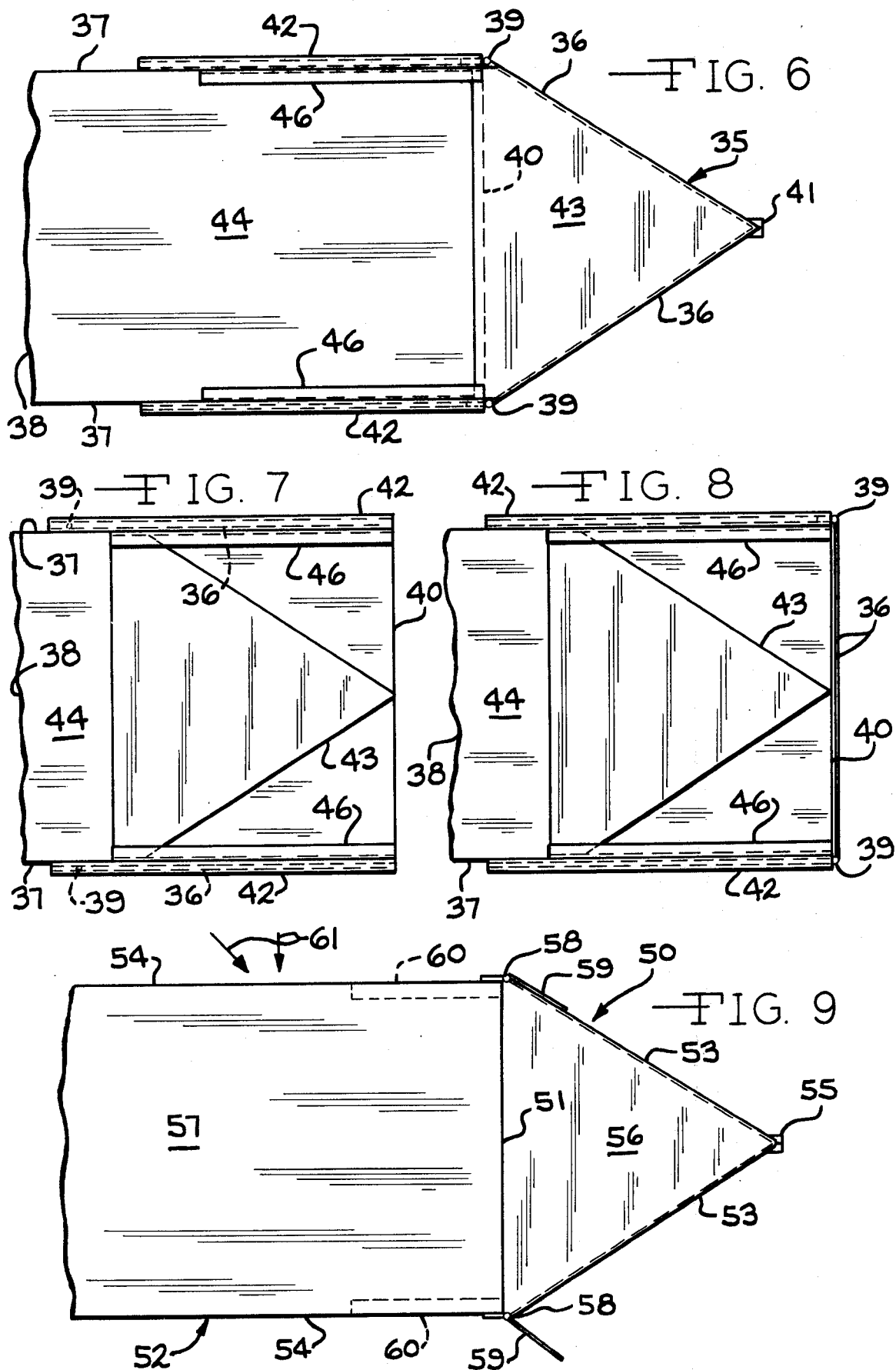

VEHICLE DRAG REDUCER

BACKGROUND OF THE INVENTION

Due to competition in freight carrier services by rail, sea and air, the trucking industry has been strongly concerned about the efficiencies of their own system. In recent years, the cost of truckage has increased as a result of increased fuel cost and mandated lower speed limits eventuating from fuel shortages. One approach to offsetting such increased costs is to decrease vehicle fuel consumption.

Fuel consumption of the freight-hauling truck tractor and trailer combinations is a function of weight, engine efficiency and air drag. Since the freight capacity must be maintained at a high level in order to satisfy the economics of trucking, the size and, thus, the weight of the truck combinations cannot be decreased enough to result in substantial fuel savings. Of course, improvements in engine efficiency will always be made but they are not sufficient by themselves to eliminate the burden caused by weight and air drag. Air drag at the rear end of the vehicle is a very important cause of poor fuel consumption. A truck tractor and trailer combination which gets about four miles to the gallon loaded, for example, may only get four and one-half miles per gallon unloaded when operated at the same high speed. It is known that this mileage can be increased by placing an air deflector above the cab of the truck trailer and by placing a drag reduction device at the rear end of the truck trailer, as illustrated in my U.S. Pat. No. 4,142,755. It is also known in the field that drag reduction devices designed for the rear end of vehicles must be removed and stored when not used. Further redesigning and modifications to the present designs for the drag reduction devices on long distance hauling vehicles will greatly reduce the air drag and thus, reduce fuel consumption and increase the ease of use of these devices.

SUMMARY OF THE INVENTION

The present invention relates to the above-described problem of air drag and its affect upon the fuel consumption of vehicles used in long hauling of freight. The invention comprises a streamlined drag reduction device at the rear end of the vehicle, whereby air drag along the rear of the vehicle is substantially decreased. A preferred embodiment of the drag reduction device is permanently connected to the rear end of the vehicle and functions as a replacement for the conventional systems of doors which currently enclose the rear ends of long hauling freight vehicles. The drag reduction device is connected together in such a manner that it can be collapsed to form a system similar to conventional doors on the rear end of the vehicle, in order to facilitate city driving. In another embodiment of the invention, spoilers are added to the sides of the vehicle to help stabilize the vehicle when it is subjected to strong side winds.

It is therefore an object of the present invention to provide a device for attachment to a long hauling freight vehicle which will produce reduced air drag at high speed driving.

It is also an object of the present invention to provide an aerodynamic drag reducer which is easily collapsible to facilitate city driving, yet capable of providing easy access to the rear end of the vehicle without necessitating removal of the drag reduction device from the vehicle.

BRIEF DESCRIPTION OF THE DRAWINGS

FIG. 1 is an overall side view of a truck, tractor and trailer combination in accordance with the present invention;

FIG. 2 is a fragmentary perspective view of the trailer in FIG. 1 illustrating one embodiment of the aerodynamic drag reducer at the rear end of the trailer;

FIG. 3 is a fragmentary cross sectional view along the line 3—3 in FIG. 2;

FIG. 6 is a fragmentary top view of a modified embodiment of the aerodynamic drag reducer of FIG. 2;

FIG. 7 is a fragmentary top view of the aerodynamic drag reducer of FIG. 6 illustrating its stored position;

FIG. 8 is a fragmentary top view of the aerodynamic drag reducer of FIG. 6 illustrating its collapsed position; and FIG. 9 is a fragmentary top plan view of a further modified embodiment of a drag reducer for a trailer including a spoiler.

DETAILED DESCRIPTION OF THE DRAWINGS

Figure 4:
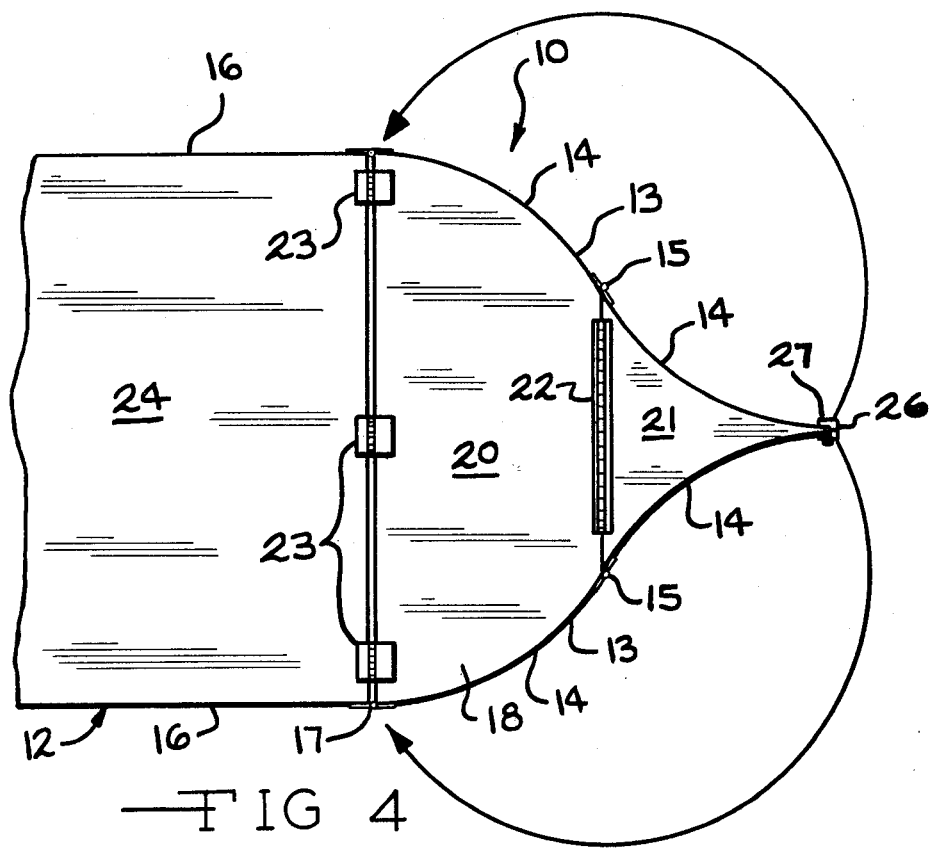
FIG. 4 is a fragmentary top view illustrating the aerodynamic drag reducer of FIG. 2.

The present invention relates to an aerodynamic drag reducer 10 as shown generally in FIG. 1. The aerodynamic drag reducer streamlines the rear end 11 of a vehicle 12 and, therefore, decreases its gas consumption when operated at high speed.

One embodiment of the aerodynamic drag reducer 10 is shown in detail in FIG. 2. Sides of the drag reducer 10 are comprised of "S" shaped panels 13, each of which is divided into two half panels 14 of equal and oppositely directed arcuate curvature. The arcuate half panels 14 are connected together by hinges 15, thus forming the "S" shaped side panels 13. The "S" panels 13 are connected to opposite sidewalls 16 of the vehicle 12 by hinges 16. A top 18 and a bottom 19 of the drag reducer 10 each are formed from two flat half panels 20 and 21 connected together by hinges 22. The side edges of the top and bottom panels 18 and 19 of the drag reducer 10 are shaped to the configuration formed by the converging edges of the side panels 13. The side edges of the top and bottom panels 18 and 19 abut the converging edges of the side panels 13, thus enclosing the rear end 11 of the vehicle 12.

Figure 5:
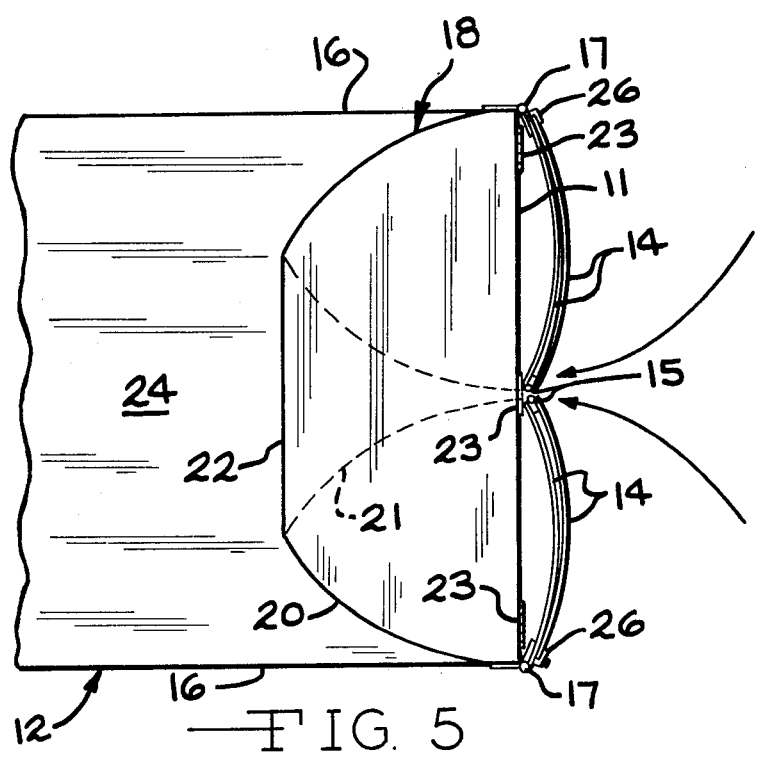
FIG. 5 is a fragmentary top view illustrating the aerodynamic drag reducer of FIG. 2 in its folded position.

The S-shaped side panels 13 fold on the hinges 15 to place the arcuate surfaces of the arcuate half panels 14 flush together. Each folded side panel 13 is made up of the two arcuate half panels 14 which can be folded flush together as shown in FIG. 5 and can be opened or closed by means of the hinges 17 attached to the rear end 11 of the vehicle 10. The folded or collapsed panels 14 act as a typical door on the rear end 11 of the vehicle. At the same time the half panels 14 are in their collapsed position as shown in FIG. 5, the top and bottom half panels 20 and 21 fold together at the hinges 22 and then the folded half panels 20 and 21 can be rotated on hinges 23 connecting them to the respective roof 24 and floor 25 of the vehicle 10 so that the folded top and bottom panel assemblies can be secured flush against the roof 24 and floor 25 of the vehicle 10. The folded flat panel assemblies then may be secured in a known fashion. The method of securing forms no part of the present invention.

Various latches or catches are provided on the different side, top and bottom panels of the drag reducer 10 to secure these panels both in the extended or operating position and in a collapsed position. For example, one or more latches 26 are provided at rear edges 27 of the side half panels 14 furthest from the vehicle end 11 for securing together the abutting rear edges 27, as best seen in FIGS. 2 and 4. FIG. 3 illustrates a latch 28 between a side half panel 14 and a top half panel 21. A plurality of similar latches 28 are provided between the four side half panels 14 and the half panels 20 and 21 forming the drag reducer top 18 and bottom 19 to stabilize the open drag reducer 10. A convention door latch (not shown) can be located on the half panels 14 adjacent the hinges 15 for locking the half panels 14 to the vehicle end 11 when the half panels 14 are collapsed and used as doors, as shown in FIG. 5. The latch 26 also may function to hold together the two hinged half panels 14 for each side panel 13 when the drag reducer 10 is collapsed. Finally, latches (not shown) may be provided to lock the collapsed drag reducer top 18 to the vehicle roof 24 and to lock the collapsed drag reducer bottom 19 to the vehicle floor 25.

FIG. 6 illustrates a modified embodiment of the aerodynamic drag reducer 35, wherein the two converging side panels 36 are flat panels connected to side walls 37 of the vehicle 38 by a hinge-slide 39. The converging flat panels 36 are secured together at a point apart from a rear end 40 of the vehicle 38 with a latch 41. The type of securing latch 41 used forms no part of the present invention. The slide hinges 39 are connected to allow the side panels 36 to rotate or pivot and also to move along guides 42 attached to the exterior of the side walls 37 of the vehicle 38. The length of each converging side panel 36 is substantially equal to the width of the rear end 40 of the vehicle 38. This, of course, may vary to meet the designer's specifications. Triangular top and bottom panels 43 of the drag reducer 35 abut and conform to the general configuration of the top and bottom edges of the converging side panels 36 and the vehicle end 40. The edges of the top and bottom panels 43 are connected by suitable latches (not shown) to the top and bottom edges of the side panels 36, thus forming an aerodynamic drag reducer 35 which completely encloses the rear end 40 of the vehicle 38. The top and bottom panels 43 of the drag reducer 35 are attached to the rear edges of a vehicle roof 44 and floor 45 by means of a slide and rail mechanism including rails 46 which are attached to the exterior of the roof 44 and the floor 45 at the rear end 40 of the vehicle 38.

In order to collapse the drag reducer 35 illustrated in FIG. 6, the top and bottom panels 43 can be slid along the rails 46 mounted on the roof 44 and floor 45 of the vehicle 38 until they are substantially flush with the vehicle roof 44 and floor 45. Then the two converging side panels 36 fold in towards the rear end 40 of the vehicle to lay flush across the rear end 40 of the vehicle, as shown in FIG. 8. One side panel 36 overlaps the other panel as they lie flush at the rear end 40 of the vehicle 38. This enables safe, efficient city driving. To open the rear end 40 of the vehicle, the top and bottom panels 43 remain flush against the vehicle roof 44 and floor 45. The side panels 36 or doors can swing outward on their hinges 39 to provide access to the vehicle end 40. The side panels 36 or doors also may be slid forward along the guides 42 attached to the vehicle side walls 37 if it is desired that they be moved out of the way of the rear end 40 of the vehicle 38, as shown in FIG. 7. Or, the guides 42 may be eliminated and the side panels 36 may be pivoted 270° on the hinges 39 to extend falt against the vehicle side walls 37. (Through this arrangement, the normal rear vehicle door may be used when making local deliveries.)

Turning now to FIG. 9, a further modified vehicle drag reducer 50 is shown mounted at the rear end 51 of a vehicle 52, such as a tractor-trailer rig. The vehicle drag reducer 50 is shown as having two side panels 53 which are in the form of flat panels hinged along the vertical corner between the rear end 51 and side 54 of the vehicle 52. In a collapsed position for city driving, the sides 53 of the vehicle drag reducer 50 are pivoted to lie flat against the vehicle sides 54. In the operating position, as shown, the side panels 53 converge together to form a generally triangular configuration in plan and are locked together with a latch 55. This configuration is enclosed by top and bottom panels 56, of which only the top panel 56 is illustrated in FIG. 9. The top panel 56 may be stowed when the vehicle drag reducer 50 is collapsed by hinging and folding over a top 57 of the vehicle 52, as illustrated in FIG. 5, or by sliding on guide rails (not shown) over the vehicle top 57, as illustrated in FIGS. 7 and 8.

The drag reducer side panels 53 are attached to the vehicle 52 by hinges 58, which may be a plurality of individual hinges or a single long piano type hinge between each panel 53 and the rear corner of the vehicle 52. A spoiler 59 is also attached to the vehicle 52 at the hinge 58. Each spoiler 59 is pivotable from a position lying against a side 53 of the extended vehicle drag reducer 50 or a position abutting the vehicle side 54 when the drag reducer 50 is collapsed for city driving. The positions of the spoilers 59 are individually controlled by hydraulic or pneumatic cylinders 60. The flow of fluid to and from the cylinder 60 is in turn controlled either manually by controls available to the driver within the vehicle cab or by a suitable automatic servo mechanism. The spoilers 59 function to stabilize the vehicle 52 when the vehicle 52 is subjected to strong or cross winds, as illustrated by the arrows 61. When the vehicle 52 is driven in open, flat country, under certain conditions it may be subjected to winds gusting to 50 or 60 miles per hour or more. Under these conditions, the vehicle 52 will tend to be very unstable. This is caused, in part, by the difference in wind velocity over the two sides 54 of the vehicle 52. The wind velocity will be considerably greater on the downwind or leeward side of the vehicle 52 than on the upwind side of the vehicle 52. By extending the downwind spoiler 59, as illustrated in FIG. 9, the wind velocity along the downwind side of the vehicle 52 is slowed down to help stabilize the vehicle. It will be apparent that the stabilizers 59 may be used either alone, or in conjunction with the vehicle drag reducer 50, as illustrated in FIG. 9.

It will be apparent that various changes and modifications can be made to suit the varying application of the vehicle drag reducer without departing from the spirit and the scope of the following claims.

What I claim is:

1. A drag reducer for use on a vehicle having two side walls each having a vertical rear edge adjacent a vehicle end, said vehicle further having a roof and a floor each having a rear edge adjacent said vehicle end, said drag reducer comprising two flat side panel assemblies, hinge means pivotally connecting said side panel assemblies to said rear edges of said vehicle side walls, said side panel assemblies converging and having edges meeting at a location spaced from the vehicle end when said drag reducer is in a first position, means for connecting together said meeting edges when said drag reducer is in such first position, top and bottom closing panel assemblies, means connecting said top assembly to said vehicle adjacent said roof rear edge, means connecting said bottom panel assembly to said vehicle adjacent said floor rear edge, said closing panel assemblies extending in the same direction and abutting said side panel assemblies when said drag reducer is positioned in said first position, said closing panel assemblies having edges in contact with abutting edges of said side panel assemblies whereby said side panel assemblies and said closing panel assemblies form an enclosed drag reducer at said vehicle end, catch means releasably connecting said closing panel assembly edges to said abutting edges of said side panel assemblies, and means including said hinge means for positioning said drag reducer in a second position wherein said panel assemblies are collapsed, said hinge means comprising hinge-slide means, said flat panels swinging on said hinge-slide means between said first position and a position with said flat panels parallel with said vehicle side walls and thence sliding forward along rail means attached to said vehicle side walls to said second position wherein said flat panels are substantially flush against said vehicle side walls.

2. A vehicle drag reducer, as set forth in claim 1, wherein said two closing panels assemblies each includes two flat half panels connected together by hinge means with said half panels folding on said connected hinge means to bring said half panels flush together.

* * * * *